(12) United States Patent
Mozer et al.

(10) Patent No.: US 12,465,740 B2
(45) Date of Patent: Nov. 11, 2025

(54) ACCESSORY FOR IMPLANTING A MEDICAL DEVICE CONFIGURED TO PLUG AN ANATOMICAL DUCT

(71) Applicant: UROMEMS, Grenoble (FR)

(72) Inventors: Pierre Mozer, Vincennes (FR); Aurélien Beaugerie, Issy les Moulineaux (FR); Riaz Mir, Fontaine (FR)

(73) Assignee: UROMEMS, Grenoble (FR)

( * ) Notice: Subject to any disclaimer, the term of this patent is extended or adjusted under 35 U.S.C. 154(b) by 834 days.

(21) Appl. No.: 17/780,319

(22) PCT Filed: Dec. 15, 2020

(86) PCT No.: PCT/FR2020/052447
§ 371 (c)(1),
(2) Date: May 26, 2022

(87) PCT Pub. No.: WO2021/123605
PCT Pub. Date: Jun. 24, 2021

(65) Prior Publication Data
US 2022/0409874 A1  Dec. 29, 2022

(30) Foreign Application Priority Data
Dec. 16, 2019 (FR) ..................... 1914521

(51) Int. Cl.
*A61M 39/08* (2006.01)
*A61B 17/12* (2006.01)
(Continued)

(52) U.S. Cl.
CPC ....... *A61M 39/08* (2013.01); *A61B 17/12013* (2013.01); *A61F 5/005* (2013.01);
(Continued)

(58) Field of Classification Search
CPC . A61M 39/08; A61M 39/20; A61B 17/12013; A61B 17/06109;
(Continued)

(56) References Cited

U.S. PATENT DOCUMENTS 5,694,978 A * 12/1997 Heilmann ............. A61M 39/20
138/89
7,597,117 B1   10/2009 Groso et al.
(Continued)

FOREIGN PATENT DOCUMENTS

DE   9419630 U1   2/1995
EP   3290683 A1   3/2018

OTHER PUBLICATIONS

French Search Report in related French Application No. 1914521, mailed Sep. 14, 2020.
(Continued)

*Primary Examiner* — James D Ponton
*Assistant Examiner* — John A Doubrava
(74) *Attorney, Agent, or Firm* — Thomas | Horstemeyer, LLP

(57) ABSTRACT

The invention relates to an accessory for implanting a medical device in a human or animal body, said medical device comprising an occlusion collar (1) adapted to surround and to seal an anatomical duct of said human or animal body, a fluid reservoir (2) and a tube (3) connecting the reservoir to the occlusion collar, said accessory comprising: —a plug (100; 100') adapted to seal an end of the tube; and —a collar (200) adapted to surround the tube, the plug (100) and the collar (200) having respective connection portions (103, 104; 203, 204) adapted to engage so as to fix the collar (200) and the plug (100) together so as to hermetically seal said end of the tube (3).

14 Claims, 7 Drawing Sheets

(51) Int. Cl.
    *A61F 5/00*     (2006.01)
    *A61M 39/20*    (2006.01)
    *A61B 17/00*    (2006.01)

(52) U.S. Cl.
    CPC ... *A61M 39/20* (2013.01); *A61B 2017/00535* (2013.01); *A61B 2017/008* (2013.01)

(58) Field of Classification Search
    CPC .... A61B 2017/00535; A61B 2017/008; A61B 2017/00477; A61B 2017/00557; A61B 2017/00805; A61F 5/005; A61F 5/0053; A61F 2/004
    See application file for complete search history.

(56)            References Cited

U.S. PATENT DOCUMENTS

2005/0283172 A1* 12/2005 Conlon ................ A61F 5/0056
                                                   606/153
2020/0288951 A1*  9/2020 Zilligen ............. A61B 1/00068

OTHER PUBLICATIONS

PCT Search Report in related PCT Application No. PCT/FR2020/052447, mailed Feb. 24, 2021.

* cited by examiner

ACCESSORY FOR IMPLANTING A MEDICAL DEVICE CONFIGURED TO PLUG AN ANATOMICAL DUCT

TECHNICAL FIELD

The invention relates to an accessory for implanting a medical device in a human or animal body configured to plug an anatomical duct.

STATE OF THE ART

There are medical devices adapted to selectively plug an anatomical duct, such as the urethra, bladder neck or stomach.

To combat urinary incontinence, it is known to implant in a patient a medical device comprising an inflatable occlusive cuff arranged around the urethra or the bladder body, a fluid reservoir and a pump for transferring fluid between the cuff and the reservoir in order to selectively inflate or deflate the cuff to provide a determined compression of the urethra or the bladder neck.

The fluid connection between these different components is provided by one or more tubes. The connection of the tube with the components is made during the implantation surgery.

Prior to implantation, the medical device is filled with a biocompatible fluid and the fluid circuit is drained to avoid the presence of air bubbles.

In order to keep the fluid circuit drained and avoid contamination of the interior of the tube and the part of the medical device associated with said tube, the ends of the tube are plugged by a stopper during implantation until the tube is actually connected to the components.

The attachment of each stopper has to be strong enough to withstand significant tensile forces exerted during implantation.

In practice, the stoppers are attached to the tube with sutures.

However, suturing each stopper to the ends of each tube is a surgeon-specific operation that lengthens the overall surgical time and can lead to complications, such as disconnection of the stopper and tube.

One object of the invention is therefore to facilitate and secure the connection between the stopper and the tube.

BRIEF DESCRIPTION OF THE INVENTION

One purpose of the invention is therefore to design an accessory allowing to simplify the surgical procedure.

To this end, a first object of the invention relates to an accessory for implanting a medical device in a human or animal body, said medical device comprising an occlusive cuff adapted to surround and plug an anatomical duct of said human or animal body, a fluid reservoir and a tube connecting the reservoir to the occlusive cuff, said accessory comprising:

a stopper adapted to plug one end of the tube, and
a collar adapted to surround the tube, the stopper and collar having respective connection
portions adapted to cooperate to attach the collar and stopper together to hermetically plug said end of the tube.

Advantageously, this eliminates the need for a suture to attach the stopper to the end of the tube.

In some embodiments, the connection portions of the stopper and the collar are arranged so as to allow interlocking of the collar with the stopper.

In some embodiments, one of the connection portions of the collar or stopper has at least one protrusion and the other connection portion of the collar or stopper (which does not include said protrusion) has at least one cavity, said at least one protrusion being elastically deformable to allow engagement of said at least one protrusion in said at least one cavity.

In some embodiments, the stopper further comprises an elongated shaped rod so as to form a guide for insertion of the tube during implantation.

By "elongated shape" it is meant a shape whose length is greater than 10 times the transverse dimension (for example, the diameter in the case of a circular cross-section).

In some embodiments, the stopper comprises an end piece adapted to be inserted into an end of the tube.

In some embodiments, the connection portion of the stopper comprises an annular groove surrounding said end piece configured to receive an elastically deformable end of the collar so as to pinch the end of the tube.

In some embodiments, the stopper has at least one gripping zone for pliers configured to connect the collar to the stopper.

In some embodiments, said gripping zone comprises two parallel flats bordered by a flange.

In some embodiments, said flats have a suture passage hole therethrough.

In some embodiments, the accessory comprises a cap adapted to surround the stopper so as to ensure continuity of the outer surface of the stopper facing the gripping zone.

In some embodiments, said cap comprises two interlocking half-shells on either side of the stopper.

In some embodiments, said half-shells are hinged by a hinge.

Another object relates to an implantation kit for implanting a medical device in a human or animal body, said medical device comprising an occlusive cuff adapted to surround and plug an anatomical duct of said human or animal body, a fluid reservoir and a tube connecting the reservoir to the occlusive cuff.

Said kit advantageously comprises an accessory as described above, and pliers including a first jaw adapted to receive a portion of the stopper opposite to the connection portion of said stopper and a second jaw adapted to receive a portion of the collar opposite to the connection portion of said collar, said jaws being movable between an open position adapted for engagement of the collar and the stopper with each respective jaw and a closed position adapted to connect the collar and the stopper through their respective connection portions.

Another object relates to an assembly comprising a medical device and an accessory as described above for implanting said medical device in a human or animal body, said medical device comprising an occlusive cuff adapted to surround and plug an anatomical duct of said human or animal body, a fluid reservoir and a tube connecting the reservoir to the occlusive cuff.

The implementation of such an accessory during the implantation of a medical device into a human or animal body may be as follows:

engaging the collar on a tube, with the connection portion of the collar located on the side of the end of the tube to be plugged;
engaging the connection portion of the stopper with the connection portion of the collar, so as to pinch the end of the tube and secure the stopper to the collar, inserting the stopper plugged by the accessory into the human or animal body to an implantation site.

BRIEF DESCRIPTION OF THE DRAWINGS

Further characteristics and advantages of the invention will be apparent from the following detailed description, with reference to the appended drawings, in which.

DETAILED DESCRIPTION OF EMBODIMENTS

The present invention finds application, among others but without being limited to, a number of medical devices, including for example artificial sphincters, artificial muscles, electrical stimulators, gastric bands, neurostimulators, vascular prostheses or penile implants. However, the present invention can be implemented in any other application requiring the formation of a passageway into which the introduction of an elongated shape such as a tube is desired.

Figure 1:
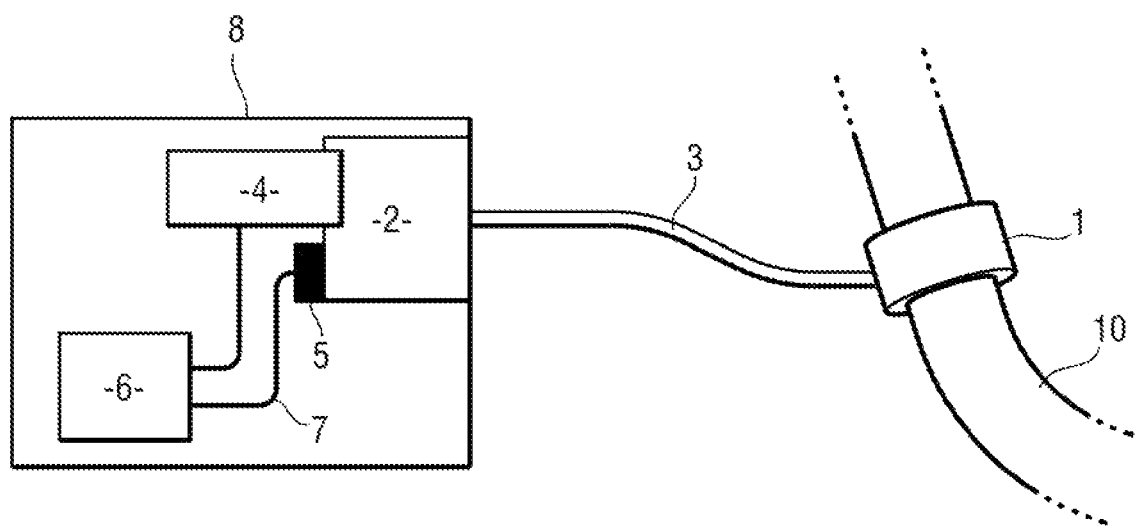
FIG. 1 is a schematic view of a medical device whose implantation is adapted to the implementation of the accessory.

FIG. 1 illustrates schematically and by way of non-limitation an artificial urinary sphincter whose implantation may be facilitated by the use of an accessory according to the invention.

Said medical device comprises an occlusive element adapted to surround a natural duct 10. The occlusive element is in the form of an inflatable cuff 1 likely to be filled with a variable amount of a fluid, whereby a variation in the pressure of the fluid within the cuff varies the compression exerted on the natural duct 10 to be occluded.

A reservoir 2 of a biocompatible fluid, for example saline, is arranged in fluid connection with the cuff, via a tube 3.

The cuff 1, the reservoir 2 and the tube 3 together form the fluid circuit of the medical device.

This fluid circuit makes it possible to transfer part of the fluid from the reservoir 2 to the cuff, in order to increase the compression exerted on the duct 10, and conversely to transfer part of the fluid from the cuff 1 to the reservoir 2, in order to decrease the compression exerted by the cuff on the duct 10.

To this end, the occlusive system further comprises an actuating device 4 to effect this transfer of fluid and thus vary the compression exerted by the cuff on the duct 10.

Particularly advantageously, the reservoir 2 has a variable volume.

For example, but without limitation, the variation in volume may be achieved by moving a wall of the reservoir, the actuating device 4 comprising an actuator for moving said wall for example according to the arrangement described in document EP3223748B1. Thus, the reservoir may comprise a rolling diaphragm, a piston, a bellows or any other means for varying its volume. The person skilled in the art is able to select, among the existing actuators, a suitable actuator according to the contemplated implementation of the reservoir. An example of such an actuator is, but without limitation, a piezoelectric actuator.

The medical device comprises a sensor for measuring the action exerted on the reservoir. For example, if the actuation consists in moving a movable wall of the reservoir, said sensor may consist of a position sensor 5, for determining the position of the movable wall. A calibration makes it possible to determine, on the one hand, the relationship between the position of the movable wall and the variation in volume of the reservoir; on the other hand, the relationship between the variation in volume of the reservoir and the pressure in the hydraulic circuit and finally between the pressure in the hydraulic circuit and the compression exerted on the duct to be occluded. Thus, it is possible to determine the movement to be imposed on the movable wall to obtain a given fluid pressure in the hydraulic circuit in order to obtain a given compression of the duct 10 by the cuff 1.

The occlusive system further comprises a control unit 6 adapted to act upon the actuator 4 so as to exert a determined compression on the duct 10.

The connection 7 between the control unit 6 and the actuating device 4 has been represented in wired form in FIG. 1, but of course it could be implemented wirelessly, depending on the technology selected by the person skilled in the art. There is also a connection 7 (wired or wireless) between the sensor 5 and the control unit 6.

The reservoir 2, the actuating device 4, the control unit 6 and the sensor 5 are arranged in a hermetic casing 8 made of a biocompatible material. The casing 8 comprises a fluid outlet which is hermetically connected to the tube 3, ensuring the fluid connection between the reservoir 2 and the tube 3.

For implantation, the cuff 1 and at least a part of the tube 3 are provided in a sterile packaging, separately from the casing. The casing 8 is also provided in a sterile packaging, with another part of the tube 3 already connected to the fluid outlet of the casing. The reservoir 2 and, if applicable, the tube 3, and the cuff 1 are supplied empty of biocompatible fluid.

In the case where the reservoir 2, the tube 3 and the cuff 2 are supplied empty of fluid, a step prior to implantation then consists in draining the fluid circuit of the air initially contained and filling it with biocompatible fluid.

During implantation, the fluid circuit is kept drained by the accessory that will be described below.

To implant the medical device, the practitioner has to place the cuff around the anatomical duct to be occluded, place the casing in an anatomical region adjacent to the natural duct 10, and connect the fluid outlet to the cuff 1 via the tube 3.

To facilitate said implantation of the medical device, an accessory is provided formed of two interlocking parts, namely a stopper adapted to plug one end of the tube 3, and a collar adapted to surround the tube 3. The collar and the stopper have respective connection portions adapted to cooperate to attach the collar and the stopper together so as to hermetically plug said end of the tube 3.

Figure 2:
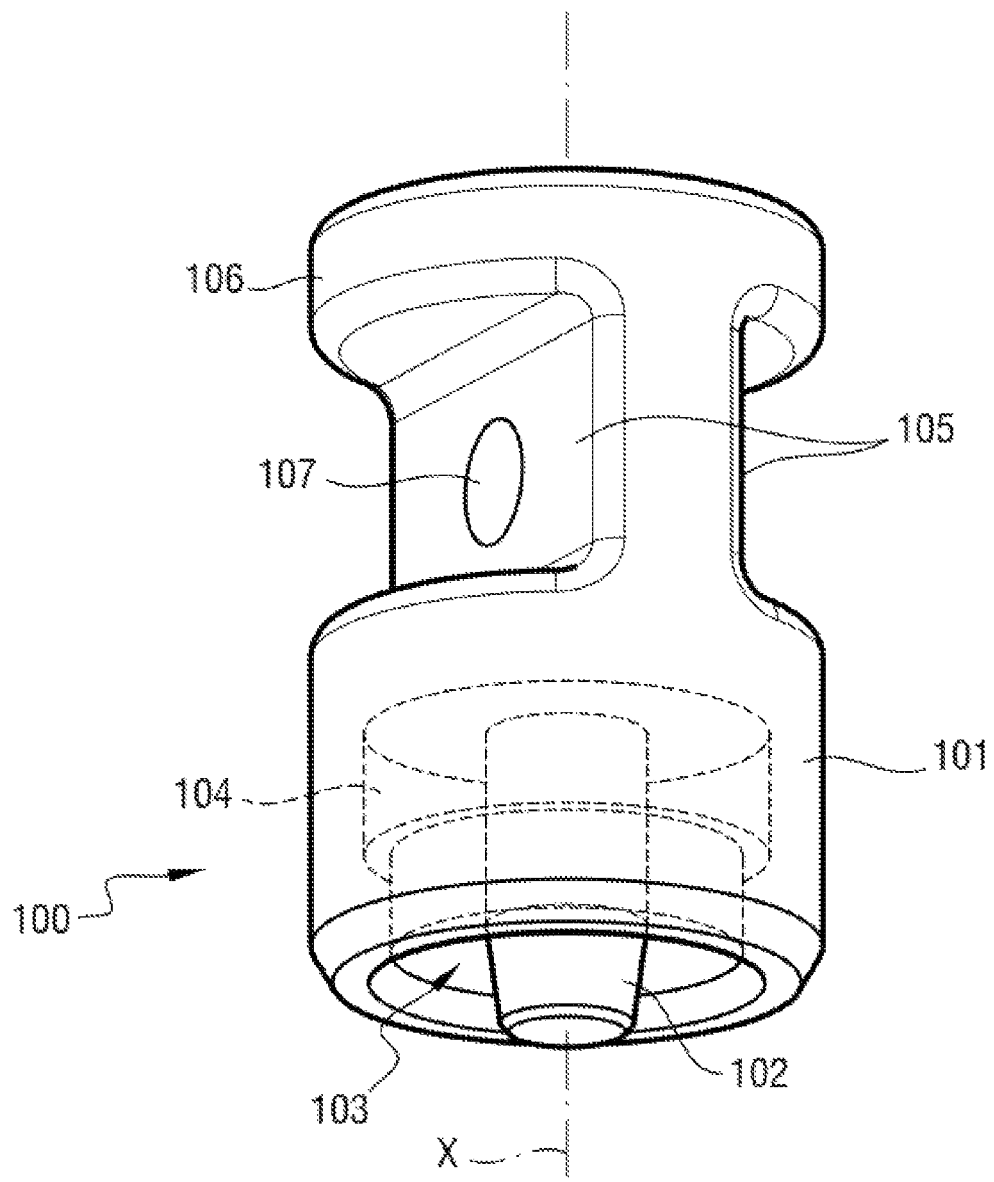
FIG. 2 is a perspective view of a stopper according to one embodiment.

FIG. 2 is a perspective view of one embodiment of the stopper.

The stopper 100 extends along a longitudinal axis X.

The stopper 100 includes a circumferential wall 101 that is inscribed in a cylinder of axis of revolution X.

One end of the stopper 100 comprises an end piece 102 adapted to be inserted into the tube 3. The outer surface of the circumferential wall 101 defines, with the end piece 102, an annular groove 103 adapted to receive the tube wall. The diameter of the end piece 102 is substantially equal to the inner diameter of the tube 3, preferably slightly larger than said inner diameter to allow a tight fit of the tube on the end piece 102, so as to ensure a hermetic connection between the tube 3 and the end piece 102. The end piece 102 has a solid shape, so as to plug the tube when the latter is fitted onto the end piece 102, which thus penetrates the interior of the tube 3.

Facing the end piece 102, the inner surface of the circumferential wall 101 includes a cavity 104 that extends over at least a part of that inner surface.

In some embodiments (not illustrated), said cavity extends through the circumferential wall 101, thereby forming a radial opening communicating with the annular groove. Such an opening may in particular allow visual checking that the tube 3 is properly fitted onto the end piece 102.

The annular groove 103 and the cavity 104 form a connection portion of the stopper on the collar.

On the side opposite to the connection portion in the direction of the longitudinal axis X, the circumferential wall 101 is provided with two zones 105 for gripping the stopper with pliers. Said gripping zones 105 may be in the form of two flats formed on either side of a plane of symmetry of the stopper passing through the longitudinal axis X. More generally, said gripping zones may be defined by a localized decrease in the thickness of the circumferential wall 101. The end of the circumferential wall forms a flange 106 delimiting said gripping zones 105 and serving as a support for holding the jaws of pliers on the gripping zones 105.

At said gripping zones 105, the circumferential wall may have a through hole 107. Said hole may allow a suture to pass in order to facilitate handling of the stopper during implantation.

Figure 3:
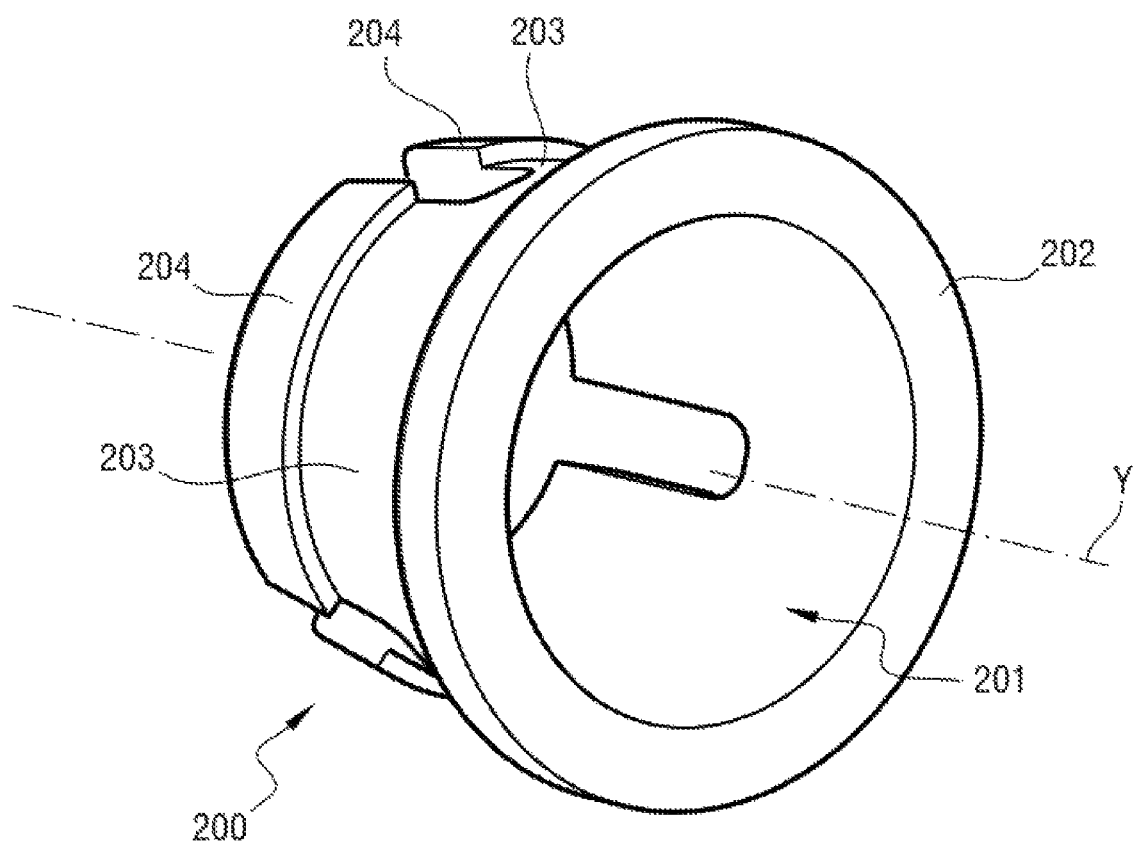
FIG. 3 is a perspective view of a collar according to one embodiment.

FIG. 3 is a perspective view of one embodiment of the collar.

The collar 200 extends along a longitudinal axis Y which, in the assembled configuration of the accessory, is coincident with the longitudinal axis X.

The collar 200 includes a through opening 201 disposed in its central part about the longitudinal axis Y.

At one end thereof, the collar 200 comprises a flange 202 that extends radially outward. Advantageously, said flange has a rounded profile, which does not damage the anatomical tissues encountered during implantation.

At the opposite end of the flange 202 along the longitudinal direction Y, the collar 200 comprises a plurality of flexible tabs 203 separated by gaps forming free spaces, oriented along the longitudinal direction Y. Each tab 203 includes a radially outward extending protrusion 204. The flexible tabs 203 and protrusions 204 form a connection portion of the collar to the stopper.

For implantation, the collar 200 is fitted around the tube, with the fitting direction selected to place the connection portion on the side of the end of the tube to be plugged. In other words, the tabs 203 are relatively closer than the collar 202 to the end of the tube to be plugged.

Furthermore, the connection portion of the stopper 100 is engaged in the connection portion of the collar 200. Thereby, the end piece 102 is inserted into the end and interior of the tube 3 and the outer wall of the tube 3 and the tabs 203 of the collar are received in the annular groove 103.

The stopper is made integral with the collar by engaging the protrusions 204 of the flexible tabs 203 in the cavity 104. To this end, the practitioner advantageously uses pliers to facilitate this engagement by exerting pressure on the collar and the stopper in opposite directions and according to a closing motion of the pliers jaws (cf. FIG. 6).

The width of the annular groove 103 is substantially equal to or slightly less than the sum of the thicknesses of the tube and the flexible tabs 203, the cavity 104 being dimensioned to be able to receive each protrusion 204 after elastic deformation of each tab 203 to engage in said annular groove 103. Advantageously, the protrusions 204 and the mouth of the annular groove 103 have respective chamfers adapted to facilitate engagement of the collar 200 in the stopper 100.

Of course, the protrusions and the groove could be replaced by other connection means capable of cooperating to provide firm interlocking. In particular, the male connection portion (such as the protrusions 204) may be arranged on the collar or on the stopper, and the female connection portion (such as the groove and cavity) may be conversely arranged in the stopper or in the collar.

Once the stopper 100 and collar 200 are integral with each other, the end of the tube is pinched between the end piece 102 and the tabs 203, providing a fluid hermeticity between the tube 3 and the stopper 100.

Figure 4:
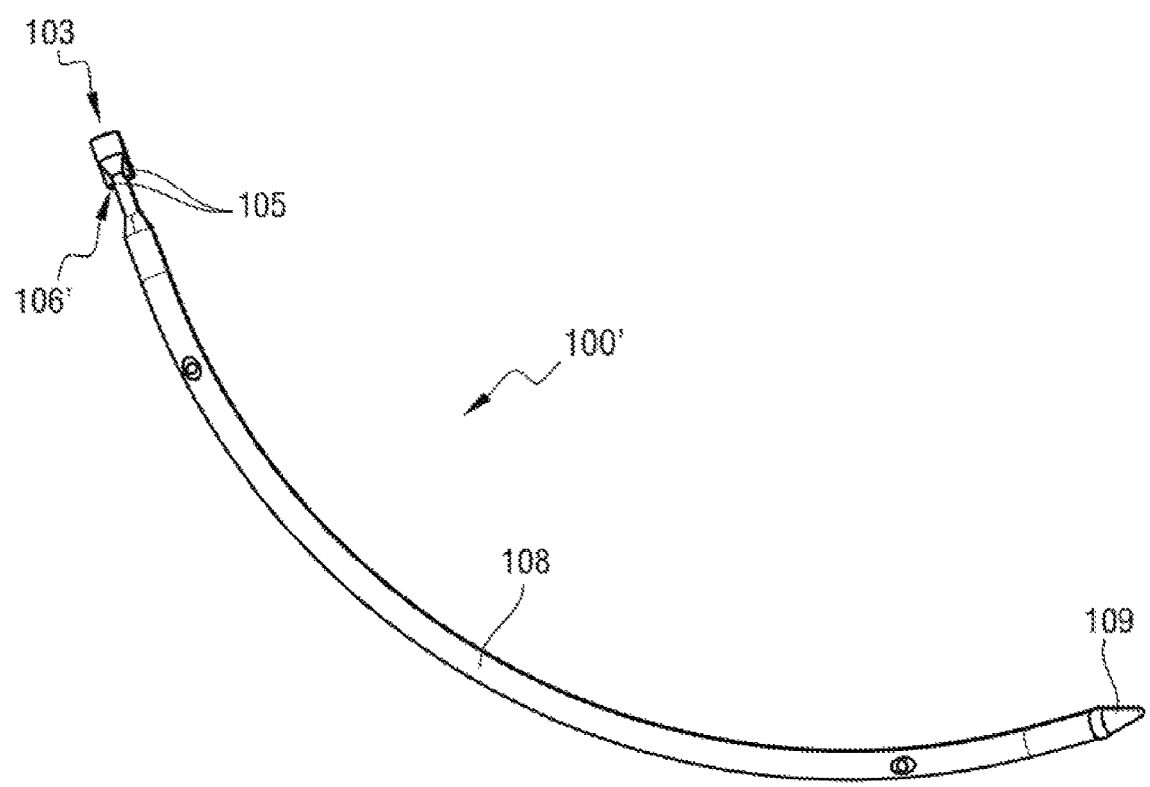
FIG. 4 is a perspective view of a stopper according to another embodiment.

FIG. 4 is a perspective view of another embodiment of the stopper, in which the stopper is elongated in shape and further functions as a guide for insertion of the tube 3 when the elongated stopper 100' and the tube 3 are connected during implantation. The reference signs common with FIG. 2 designate elements that are similar or perform the same function and will therefore not be described again.

According to this particular embodiment of the invention, the stopper 100' has a connection portion similar to that of the stopper in FIG. 2. Said connection portion comprises the annular groove 103 and the end piece 102.

By contrast, on the side opposite to the connection portion in the longitudinal direction, the stopper 100' is extended by an elongated rod 108, the length of which is typically several centimeters. The rod 108 is solid and advantageously has a conical but not pointed end 109 to facilitate introduction into the tissues without significantly damaging them. By virtue of this rod 108, passing the tube 3 through the tissues to be passed through between the two implantation sites, that for the cuff 1 and that for the casing 8, is facilitated.

Generally speaking, the stopper and the collar are free of sharp edges but have connection fillets to minimize the risk of damaging the tissues being passed through.

Figure 7:
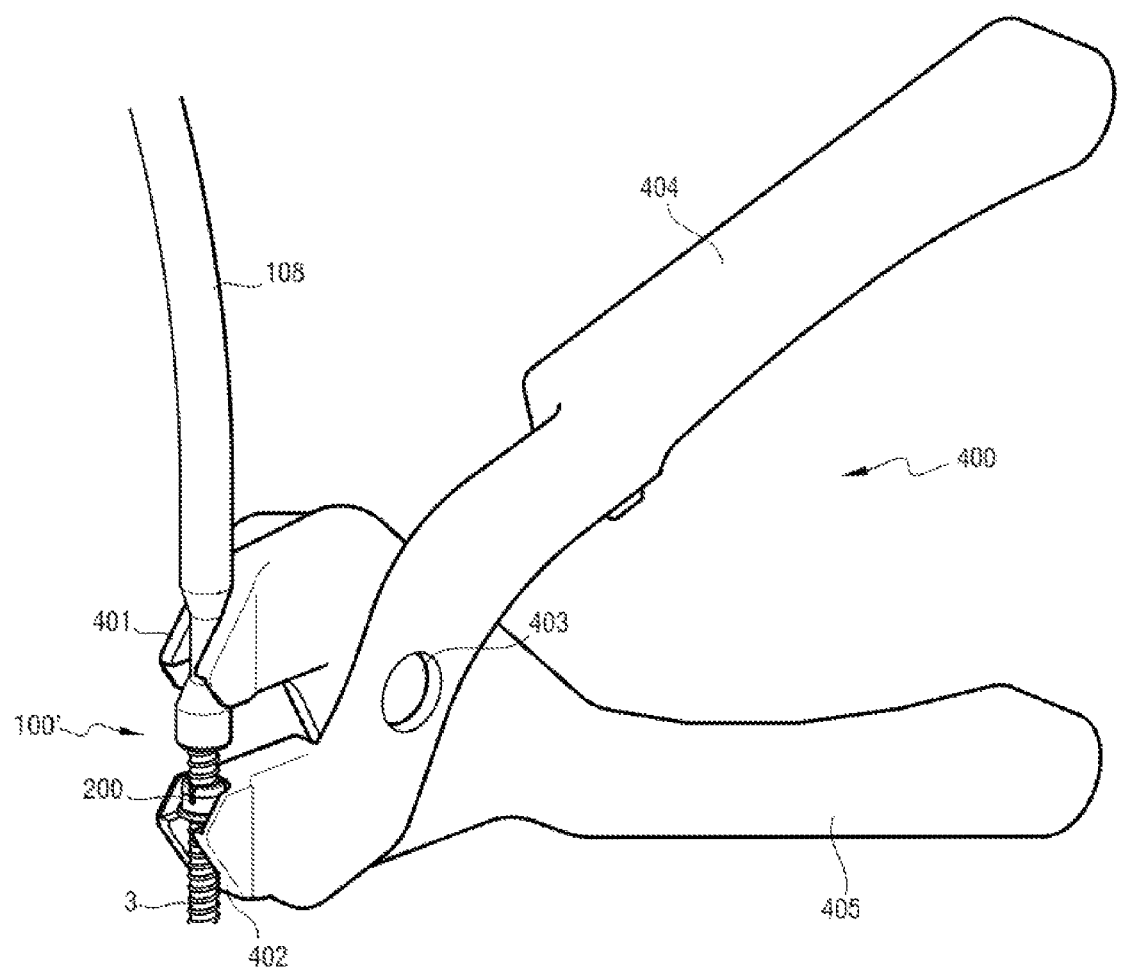
FIG. 7 is a perspective view of the connection of the stopper of FIG. 4 and the collar of FIG. 3 by means of pliers.

Like the stopper 100 of FIG. 2, the stopper 100' includes gripping zones 105 that allow the use of pliers for handling the stopper or for interlocking the stopper onto the collar (see FIG. 7).

Said pliers typically comprise a first jaw adapted to receive a portion of the stopper opposite to the connection portion of said stopper along the longitudinal direction, a second jaw adapted to receive a portion of the collar opposite to the connection portion of said collar along the longitudinal direction, said jaws being pivotably movable about a hinge axis. On the side opposite to each jaw from the hinge axis, the pliers include two handles adapted for gripping the pliers by a practitioner. In the open position of the pliers, the jaws are spaced apart from each other by a sufficient distance to allow engagement of the collar and stopper with each respective jaw. When the pliers are closed, the jaws hold the stopper facing the collar; the practitioner benefits from a lever arm to allow easy interlocking of the collar and the stopper by their respective connection portions.

Particularly advantageously, the accessory further comprises a cap 300 adapted to surround the gripping zones 105 so as to ensure continuity of the outer surface of the stopper facing said gripping zones, after the stopper has been interlocked onto the collar, for example by means of pliers. This continuity of the outer surface in the longitudinal direction of the stopper prevents damage to the tissue.

Figure 5:
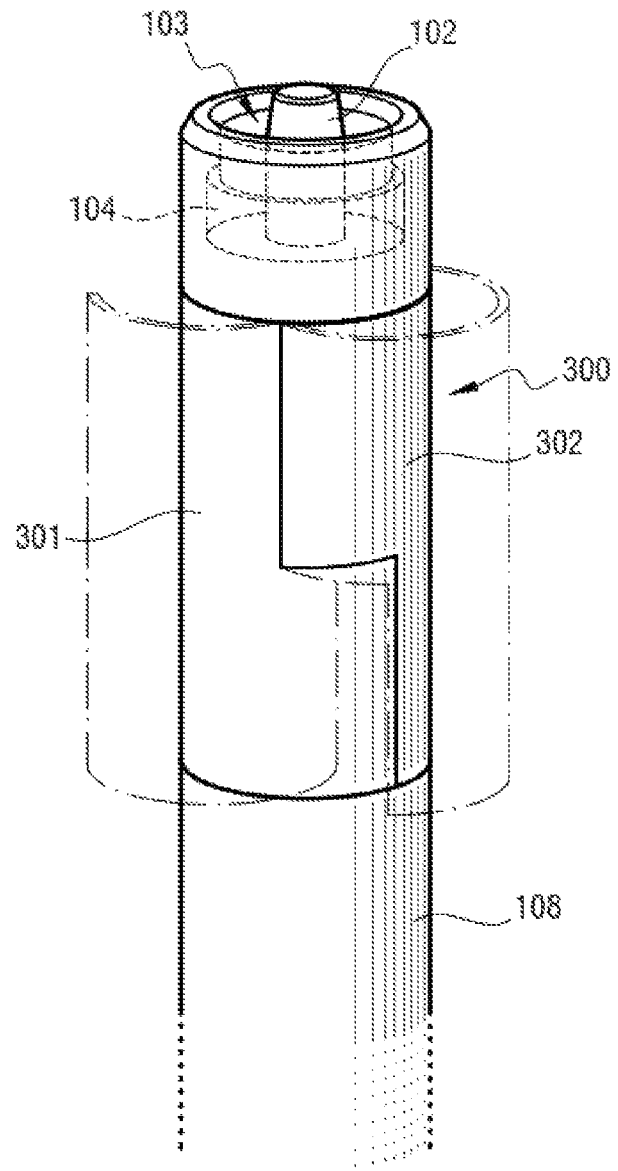
FIG. 5 illustrates a cap adapted to ensure continuity of the outer surface of the stopper facing the gripping zones.

According to one embodiment illustrated in FIG. 5, said cap 300 comprises two interlocking half-shells 301, 302 on either side of the stopper. When said half-shells are assembled around the gripping zone of the stopper, they have a cylindrical outer surface of substantially the same diameter as the rod 108. Preferably, said half-shells 301, 302 are integral with each other and hinged by a hinge. Thus, the practitioner has only one object to handle to place the two half-shells around the gripping zone of the stopper, which improves ergonomics.

Figure 6:
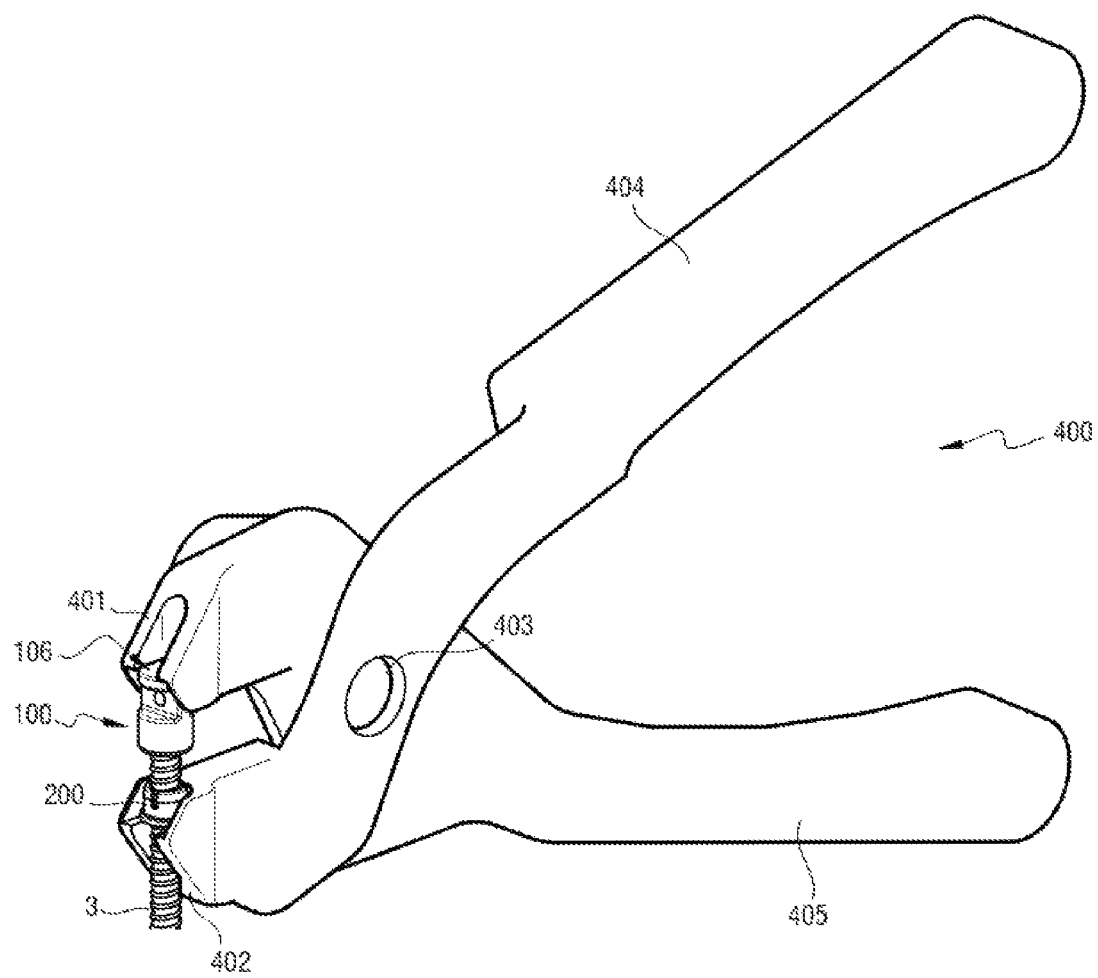
FIG. 6 is a perspective view of the connection of the stopper of FIG. 2 and the collar of FIG. 3 by means of pliers.

FIG. 6 illustrates a step of connecting the stopper 100 of FIG. 2 with the collar 200 using pliers 400.

The pliers 400 comprise a first jaw 401 adapted to receive a portion of the stopper 100 opposite to the connection portion of said stopper along the longitudinal direction. Preferably, to this end the first jaw comprises a housing adapted to receive the gripping zones 105 of the stopper or to bear on the flange 106.

The pliers comprise a second jaw 402 adapted to receive a portion of the collar 200 opposite to the connection portion of said collar along the longitudinal direction. To this end, the second jaw 402 comprises a housing adapted to receive the flange 202 of the collar. Said housing has a through opening for passing the tube 3 on which the collar 200 has been previously fitted.

Said jaws 401, 402 are pivotably movable about a hinge axis 403.

The pliers 400 further comprise handles 405, 404 respectively opposite to the jaws 401, 402 with respect to the hinge axis 403.

In FIG. 6, the pliers are represented in the open position, with the jaws spaced apart by a sufficient distance to allow the stopper and collar to be engaged in said jaws.

To connect the stopper and collar, the user exerts pressure on the handles 404, 405 so as to bring them together, thereby bringing the jaws together which, by virtue of the pressure they exert on the collar and stopper, allow their connection portions to engage each other.

FIG. 7 illustrates a step of connecting the stopper 100' of FIG. 4 with the collar 200 by means of the pliers 400, which are identical to those of FIG. 6. The pliers will therefore not be described in detail again.

In this embodiment, preferably the stopper 100' is held in the housing of the first jaw 401 by its gripping zones 105 which come to bear by their edge 106' opposite to the connection portion against a surface of the jaw. Said housing has a through opening for passing the rod 108.

The pliers may be provided to the practitioner with one or more stoppers and one or more collars, in the form of an implantation kit.

It is understood that the embodiments described above are particular and non-limiting examples and that various modifications can be made without departing from the invention.

The invention claimed is:

1. An accessory for implanting a medical device in a human or animal body, said medical device comprising an occlusive cuff adapted to surround and constrict an anatomical duct of said human or animal body, a fluid reservoir and a tube connecting the fluid reservoir to the occlusive cuff, said accessory comprising:
   a stopper dimensioned so as to be able to plug one end of the tube, and
   a collar dimensioned so as to be able to surround the tube, the stopper and the collar having respective connection portions adapted to cooperate to attach the collar and the stopper together so as to hermetically plug said end of the tube;
   wherein the stopper comprises an end piece adapted to be inserted into an end of the tube, and wherein the connection portion of the stopper comprises an annular groove surrounding said end piece configured to receive an elastically deformable end of the collar so as to pinch the end of the tube.

2. The accessory according to claim 1, wherein the connection portions of the stopper and the collar are arranged so as to allow interlocking of the collar with the stopper.

3. The accessory according to claim 1, wherein one of the connection portions of the collar or the stopper has at least one protrusion and the other connection portion of the collar or the stopper has at least one cavity, said at least one protrusion being elastically deformable to allow engagement of said at least one protrusion in said at least one cavity.

4. The accessory according to claim 1, wherein the stopper further comprises an elongated rod so as to form a guide for insertion of the tube upon implantation of the tube in said human or animal body.

5. The accessory according to claim 1, wherein the stopper has at least one gripping zone for pliers configured to connect the collar to the stopper.

6. The accessory according to claim 5, wherein the gripping zone comprises two parallel flats bordered by a flange.

7. The accessory according to claim 5, comprising a cap adapted to surround the stopper so as to ensure continuity of an outer surface of the stopper facing the gripping zone.

8. The accessory according to claim 6, wherein said flats have a suture passage hole therethrough.

9. The accessory according to claim 7, wherein said cap comprises two interlocking half-shells on either side of the stopper.

10. The accessory according to claim 9, wherein said half-shells are hinged by a hinge.

11. An implantation kit comprising an accessory according to claim 1, and pliers including a first jaw adapted to receive a portion of the stopper opposite to the connection portion of said stopper and a second jaw adapted to receive a portion of the collar opposite to the connection portion of said collar, said jaws being movable between an open position adapted for engagement of the collar and the stopper with each respective jaw and a closed position adapted to connect the collar and the stopper through their respective connection portions.

12. An assembly comprising:
    a medical device adapted to be implanted in a human or animal body, said medical device comprising an occlusive cuff adapted to surround and constrict an anatomical duct of said human or animal body, a fluid reservoir and a tube connecting the fluid reservoir to the occlusive cuff, and
    an accessory according to claim 1 for implanting said medical device in a human or animal body.

13. An accessory for implanting a medical device in a human or animal body, said medical device comprising an occlusive cuff adapted to surround and constrict an anatomical duct of said human or animal body, a fluid reservoir and a tube connecting the fluid reservoir to the occlusive cuff, said accessory comprising:

a stopper dimensioned so as to be able to plug one end of the tube, and a collar dimensioned so as to be able to surround the tube, the stopper and the collar having respective connection portions adapted to cooperate to attach the collar and the stopper together so as to hermetically plug said end of the tube, the stopper further comprising an elongated rod so as to form a guide for insertion of the tube upon implantation of the tube in said human or animal body.

14. An accessory for implanting a medical device in a human or animal body, said medical device comprising an occlusive cuff adapted to surround and constrict an anatomical duct of said human or animal body, a fluid reservoir and a tube connecting the fluid reservoir to the occlusive cuff, said accessory comprising:

a stopper dimensioned so as to be able to plug one end of the tube, and a collar dimensioned so as to be able to surround the tube, the stopper and the collar having respective connection portions adapted to cooperate to attach the collar and the stopper together so as to hermetically plug said end of the tube, the stopper having at least one gripping zone for pliers configured to connect the collar to the stopper, the accessory further comprising a cap adapted to surround the stopper so as to ensure continuity of an outer surface of the stopper facing the gripping zone.

* * * * *